United States Patent
Dreier

(10) Patent No.: US 8,343,010 B2
(45) Date of Patent: Jan. 1, 2013

(54) SHIFT TO DIRECT DRIVE DURING COAST CONDITIONS

(75) Inventor: Loren Christopher Dreier, Southern Pines, NC (US)

(73) Assignee: ZF Friedrichshafen AG, Friedrichshafen (DE)

( * ) Notice: Subject to any disclaimer, the term of this patent is extended or adjusted under 35 U.S.C. 154(b) by 839 days.

(21) Appl. No.: 12/413,260

(22) Filed: Mar. 27, 2009

(65) Prior Publication Data

US 2010/0248896 A1 Sep. 30, 2010

(51) Int. Cl.
*F16H 61/21* (2006.01)
*F16H 61/68* (2006.01)
*F16H 59/16* (2006.01)
*F16H 59/18* (2006.01)
*F16H 59/50* (2006.01)
*F16H 59/66* (2006.01)
*F16H 59/70* (2006.01)

(52) U.S. Cl. .................................. 477/118; 477/901
(58) Field of Classification Search .................. 477/118, 477/901
See application file for complete search history.

(56) References Cited

U.S. PATENT DOCUMENTS

| | | | | |
|---|---|---|---|---|
| 4,208,925 A * | 6/1980 | Miller et al. | | 701/51 |
| 4,603,582 A * | 8/1986 | Middleton | | 73/511 |
| 4,933,850 A * | 6/1990 | Wheeler | | 701/56 |
| 5,289,740 A * | 3/1994 | Milunas et al. | | 701/57 |
| 5,651,752 A * | 7/1997 | Wakahara et al. | | 477/181 |
| 5,881,600 A | 3/1999 | Fan | | |
| 6,106,434 A * | 8/2000 | Ibamoto et al. | | 477/118 |
| 6,246,942 B1 * | 6/2001 | Dobler et al. | | 701/51 |
| 6,875,155 B2 * | 4/2005 | Wadas et al. | | 477/109 |
| 7,149,617 B2 | 12/2006 | DeVore et al. | | |
| 7,294,092 B2 * | 11/2007 | Walker et al. | | 477/107 |
| 7,350,430 B2 | 4/2008 | Heinzelmann | | |
| 7,680,575 B2 * | 3/2010 | Han et al. | | 701/55 |
| 2008/0183371 A1 * | 7/2008 | Wolfgang et al. | | 701/103 |
| 2009/0030582 A1 * | 1/2009 | Jacobi et al. | | 701/51 |
| 2009/0118922 A1 * | 5/2009 | Heap et al. | | 477/115 |
| 2010/0076653 A1 * | 3/2010 | Ronge | | 477/118 |
| 2010/0305822 A1 * | 12/2010 | Kresse et al. | | 701/56 |

OTHER PUBLICATIONS

Alexander L. Kapelevich (Thermotech Company) and Thomas M. McNamara (Thermotech Company), *Introduction to Direct Gear Design*, http://www.thermotech.com/pdf/Gears_Powertrain_Congress_Paper.pdf (15 pages).

Martin Buerkle, *Examination of High-Speed Helical Gear Mesh Efficiency and Influences* (Abstract), http://interpro-academics.engin.umich.edu/mfgeng_prog/documents/Martin_Buerkle.pdf (1 page).

\* cited by examiner

*Primary Examiner* — David D Le
*Assistant Examiner* — Jacob S Scott
(74) *Attorney, Agent, or Firm* — Brinks Hofer Gilson & Lione

(57) ABSTRACT

A method and system for automated manual transmission shift methodologies for coasting conditions are disclosed. A coast condition is detected in a vehicle having a transmission that couples prime mover power from a transmission input to a transmission output at a plurality of different gear ratios. A target gear ratio is selected based on the power loss attributes associated with each gear ratio. Each gear ratio is associated with a power loss attribute indicative of a power loss between the transmission input and transmission output when prime mover power is coupled from the transmission input to the transmission output using that gear ratio. The transmission is shifted from a current gear ratio to the target gear ratio if the target and current gear ratios differ. By selecting the target gear ratio, vehicle fuel efficiency is improved, while keeping the vehicle under constant prime mover braking or continuous prime mover control.

20 Claims, 3 Drawing Sheets

SHIFT TO DIRECT DRIVE DURING COAST CONDITIONS

TECHNICAL FIELD

This application relates generally to control methods for vehicle transmissions, and more specifically, to hybrid automated manual transmission and non-hybrid automated manual transmission shift methodologies for coasting conditions.

BACKGROUND

Vehicle operating costs per mile are an ever-increasing concern of the automotive industry and the trucking segments of the transportation industry. Reducing vehicle fuel consumption is one way to improve vehicle operating costs. Manufacturers of major drive-train components, such as engines, transmissions, and axles are continually developing new technologies and refining existing technologies to reduce fuel consumption. Some examples of these developments include hybrid engine systems that internally generate more power per fixed volume of fuel, using mechanical components with lower frictional attributes, reducing exhaust system back pressure, and improving the manufacturing tolerances of transmission gear teeth.

Trucks utilizing automated mechanical transmissions (also referred to as automated manual transmissions or AMTs) depend on gear shifting logic or algorithms to determine the appropriate gear for a wide variety of conditions. Shift decisions may be based on balancing a variety of factors, including maximizing fuel efficiency, maximizing performance, and providing a desired driving experience.

In many driving situations, engine-generated power is not required at the wheels. In these coasting situations, some systems reduce fuel consumption by shifting a transmission to a neutral state, thus eliminating engine braking or any other frictional losses associated with components or systems positioned in the drive-train between the decoupled transmission and the engine, including components of the decoupled transmission. However, constant engine braking or continuous engine control is often required to maintain a safe distance between moving vehicles or to safely operate a vehicle in heavy traffic conditions, hilly regions, routes that cross railroad tracks, and during highway use with cruise control operation. The need for continuous engine control is even more important for trucks and other heavy vehicles, in which vehicle brakes are prone to overheating and failure when overused. In some jurisdictions, shifting the transmission to a neutral state while coasting downhill is illegal.

BRIEF SUMMARY

Therefore, it would be advantageous if a transmission system could incorporate efficiency information when selecting a transmission gear ratio during vehicle coasting conditions. Specifically, an automated mechanical transmission that considers the power losses associated with a transmission gear ratio, and selects a gear ratio based on such power losses, may improve vehicle fuel efficiency during coasting conditions.

In one embodiment, there is a method of changing gear ratios of a transmission in a vehicle. A vehicle has a transmission that can couple prime mover power from a transmission input to a transmission output at a number of different gear ratios. Each gear ratio is associated with a power loss attribute indicative of a power loss between the transmission input and the transmission output when the prime mover power is coupled from the transmission input to the transmission output using that gear ratio. In response to detecting a vehicle coast condition, a target gear ratio is selected based on the power loss attributes associated with each gear ratio. If the target gear ratio is not the same as a current gear ratio, the transmission is shifted from the current gear ratio to the target gear ratio. Exemplary coasting conditions include detecting a predetermined position of a vehicle throttle pedal, brake pedal, throttle, detecting a predetermined setting of a power metering device of the prime mover, or detecting a predetermined grade of a road surface the vehicle is travelling on. In one implementation, each gear ratio is also associated with a torque multiplier attribute indicative of an effectiveness of the associated gear ratio for prime mover braking, such as engine braking or regenerative braking, and the selection of the target gear ratio is also based on the torque multiplier attribute associated with each gear ratio.

In another embodiment, there is a method of changing gear ratios of a transmission in a vehicle. A coast condition is detected in a vehicle with a transmission that couples prime mover power from a transmission input to a transmission output at a number of gear ratios. Each gear ratio is associated with a power loss attribute indicative of a power loss between the transmission input and transmission output when the prime mover power is coupled from the transmission input to the transmission output using that gear ratio. Each gear ratio is also associated with a torque multiplier attribute indicative of an effectiveness of that gear ratio for prime mover braking, such as engine braking or regenerative braking. A target gear ratio is selected based on the power loss attribute and the torque multiplier attribute associated with each gear ratio. The transmission is shifted from a current gear ratio to the target gear ratio if the target gear ratio is not the same as the current gear ratio. Exemplary coasting conditions include detecting a predetermined position of a vehicle throttle, brake pedal, or throttle pedal, detecting a predetermined setting of a power metering device of the prime mover, or detecting a predetermined grade of a road surface the vehicle is travelling on.

In yet another embodiment, a vehicle comprises a prime mover, a transmission, a sensor operative to receive a signal indicative of a coasting condition of the vehicle, and a controller in communication with the sensor and the transmission. The transmission can couple power from the prime mover from a transmission input to a transmission output at a number of different gear ratios. Each gear ratio is associated with a power loss attribute indicative of a power loss between the transmission input and transmission output when the prime mover power is coupled from the transmission input to the transmission output using that gear ratio. The controller shifts the transmission to a current gear ratio, and can detect a coasting condition. The controller can select a target gear ratio based the power loss attribute associated with each gear ratio, and can shift from the current gear ratio to the target gear ratio if the target gear ratio is not the same as the current gear ratio. Exemplary coasting conditions include detecting a predetermined position of a vehicle throttle, brake pedal, or throttle pedal, detecting a predetermined setting of a power metering device of the prime mover, or detecting a predetermined grade of a road surface the vehicle is travelling on. In one implementation, each gear ratio is also associated with a torque multiplier attribute indicative of an effectiveness of the associated gear ratio for prime mover braking, such as engine braking or regenerative braking, and the selection of the target gear ratio is also based on the torque multiplier attribute associated with each gear ratio.

Other embodiments, features, and advantages thereof are possible and will be, or will become, apparent to one with skill in the art upon examination of the following figures and detailed description. Hence, it is intended that the scope of the claimed invention as recited in the claims below will not be limited to the embodiments shown and described herein.

DETAILED DESCRIPTION OF THE DRAWINGS AND THE PRESENTLY PREFERRED EMBODIMENTS

Fuel efficiency is an ever-increasing concern for vehicle operators, particularly operators of commercial trucks transporting heavy payloads. The introduction of automated manual transmissions (AMTs) in the heavy-duty truck market brought with it the possibility of employing shift algorithms designed to reduce fuel consumption. AMT controllers may monitor messages broadcast by vehicle systems such as anti-lock brake systems (ABS), engine systems, or other vehicle systems with electronic controllers, and may react to those messages by selecting a gear ratio that may improve fuel efficiency.

A vehicle coast condition is one operating scenario in which fuel efficiency may be improved. Coast conditions may be indicated by a variety of sensor inputs or messages available to the controller. For example, the controller may detect that the vehicle operator is not depressing the accelerator (throttle) or brake pedals, or that the throttle is in the closed (idle) position. In another example, the controller may detect that the vehicle speed remains constant or increases because of the force of gravity, and not solely because of engine or prime mover power.

Some transmission systems may attempt to improve fuel efficiency during coasting conditions by shifting to neutral when engine-generated power is not required at the wheels. As previously noted, this approach may be unsafe or prohibited by law in certain states or countries. A transmission controller may more safely improve fuel efficiency during coasting conditions by selecting a more efficient gear ratio. Gear ratios in a transmission may have differing power losses associated with factors such as gear oil churning, frictional losses, the number of gear meshes engaged when transmitting power from the transmission input to the transmission output, or the number of moving parts when a gear ratio is engaged. By selecting a gear ratio with relatively lower power losses, fuel efficiency may be improved while maintaining constant engine braking or continuous engine control through the vehicle drivetrain. Such a transmission controller system and method are explained in further detail below through the figures and accompanying text.

Figure 1:
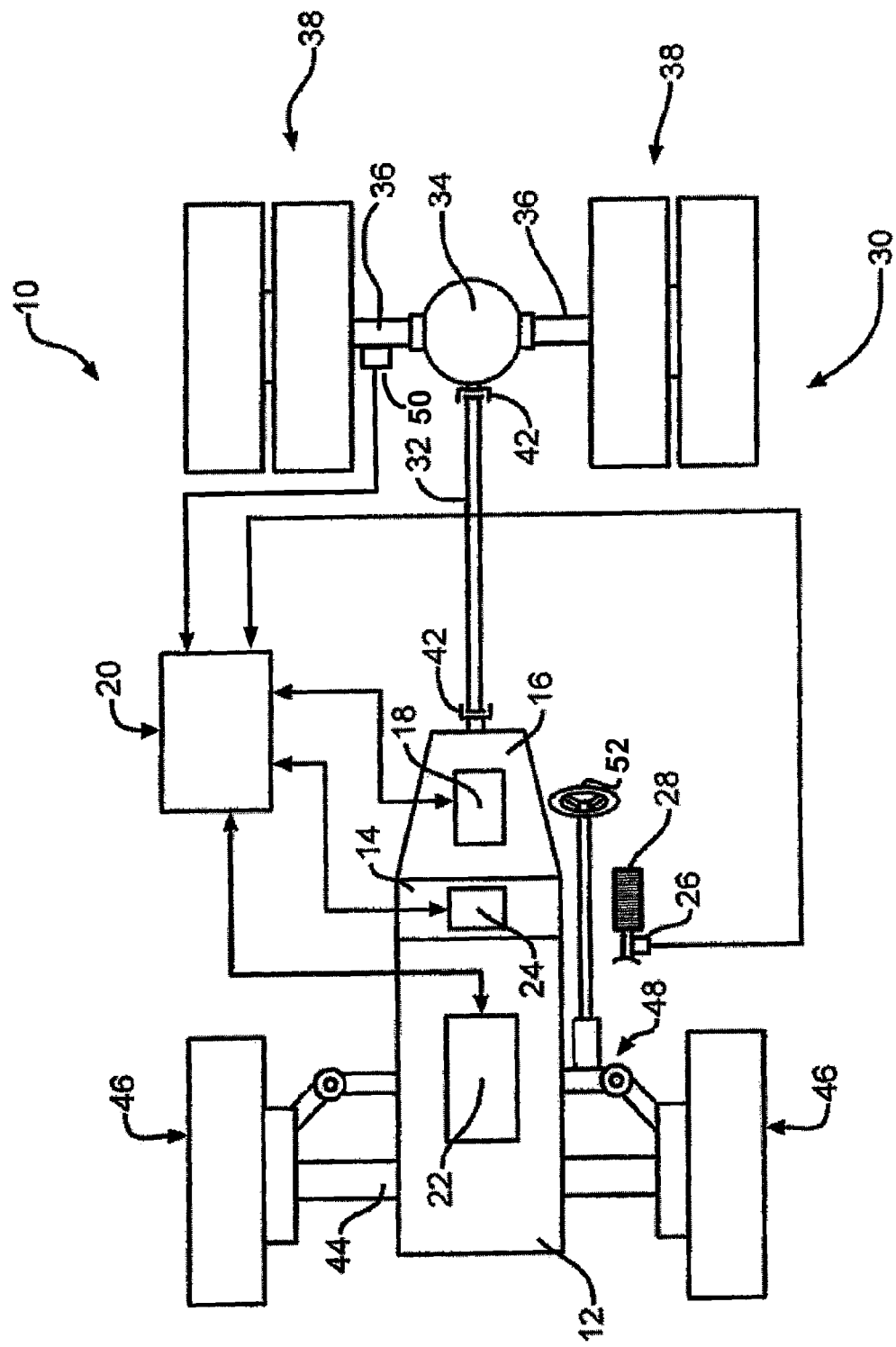
FIG. 1 is a diagram illustrating an exemplary vehicle.

FIG. 1 is a diagram illustrating an exemplary vehicle. A vehicle 10 includes a prime mover 12 which may be an internal combustion gas, natural gas, or diesel engine. In some embodiments, the prime mover 12 is an electric motor. In other embodiments, the prime mover 12 may be a combination of any two power sources, such as an electric motor and an internal combustion engine, that individually or cooperatively provide power to move the vehicle 10. Vehicles containing two or more power sources are often referred to as hybrid vehicles. In one embodiment, an output of the prime mover 12 may be to a master friction clutch 14.

The master friction clutch 14 selectively and positively engages some or all of the power output of the prime mover 12 to an input of a multiple speed change gear transmission 16. While not shown in FIG. 1, in some hybrid vehicle embodiments, the master friction clutch 14 may decouple the power output of one power source of the prime mover 12, such as an internal combustion engine, from an input of the transmission 16, while allowing the power output of a second power source of the prime mover 12, such as an electric motor, to remain coupled to a transmission input. In one such configuration, an internal combustion engine may be coupled to the vehicle drivetrain upstream of the master friction clutch 14, while an electric motor may be coupled to the vehicle drivetrain downstream of the master friction clutch 14. The transmission 16 may be of the type currently referred to as an automated mechanical transmission (AMT) wherein gear or speed ratio changes of a main transmission, a splitter and a planetary gear assembly, for example, are all achieved by an automated, i.e., electric, hydraulic, or pneumatic, shift and actuator assembly 18 under the control of a master microprocessor or controller 20.

The master microprocessor or controller 20 also includes a data and control link to an engine controller 22 which will typically include an engine speed sensor and a fuel control or other power metering device, such as a throttle, capable of adjusting and controlling the speed or power output of the prime mover 12. In one embodiment, the controller 20 includes a driving speed control unit to adjust or maintain the speed of the vehicle 10. The master controller 20 may also provide control signals to a master friction clutch operator assembly 24 which controls the engagement and disengagement of the master friction clutch 14. A throttle position sensor 26 senses the position of a vehicle throttle, power metering device, or accelerator pedal 28 and may provide real time data regarding the setting of a prime mover power metering device or position of the throttle pedal 28 to the master controller 20. Although not shown in FIG. 1, a brake pedal position sensor may sense the position of a vehicle brake pedal and provide real time data regarding the position of the brake pedal to the master controller 20. A vehicle speed sensor 50 may provide an input indicative of the number of revolutions of the axle 36 (and thus the wheels 38) per unit of time, which may be used by the master controller 20 to compute the real-time speed of the vehicle 10. In another embodiment, the vehicle speed sensor 50 is a wheel speed sensing component of a vehicle braking system, such as an anti-lock braking system (ABS) or an electronic braking system (EBS), and provides an input indicative of the wheel speed.

The master microprocessor or controller 20 and all of its components may be implemented in hardware, such as circuitry suitable to implement the functionality as described herein, software (which may include firmware), or a combination of hardware and software. In one embodiment, the controller 20 may incorporate other functionality, and therefore may also monitor and control other systems of the vehicle 10 in addition to the transmission 16. In another embodiment, the controller 20 primarily monitors the transmission 16 and controls the selection of gears or speed ratios of main transmission, splitter and planetary gear assembly, and may exchange commands and status messages with other microprocessors or controllers in the vehicle 10.

The output of the transmission 16 is provided to a driveline assembly 30, including a propshaft 32 that drives a differential 34. The differential 34 provides drive torque to a pair of axles 36, which are in turn coupled to rear left and right tire and wheel assemblies 38. The tire and wheel assemblies may be either a dual configuration as illustrated or a single configuration with one drive wheel tire on each side of the vehicle. Suitable universal joints 42 may be utilized as necessary with the rear propshaft 32 to accommodate static and dynamic offsets and misalignments thereof. An axle 44 pivotally supports a pair of front tire and wheel assemblies 46, which are controllably pivoted by a steering linkage 48 that is coupled to and positioned by a steering wheel 52. Other embodiments of the vehicle 10 are also possible, including configurations in which the prime mover 12 drives the front tire and wheel assemblies 46 through the driveline assembly 30, and in which the rear left and right tire and wheel assemblies 38 are not driven. In other configurations, the prime mover 12 may drive all of the wheels 46 and 38 through the driveline assembly 30. Although not shown in FIG. 1, the vehicle 10 may include an enclosure, vehicle bed, or tank suitable for transporting cargo or liquids. In another embodiment, the vehicle may be configured to tow a trailer, such as an enclosed trailer, a flatbed trailer, or a tank trailer, for the same purpose.

Figure 2:
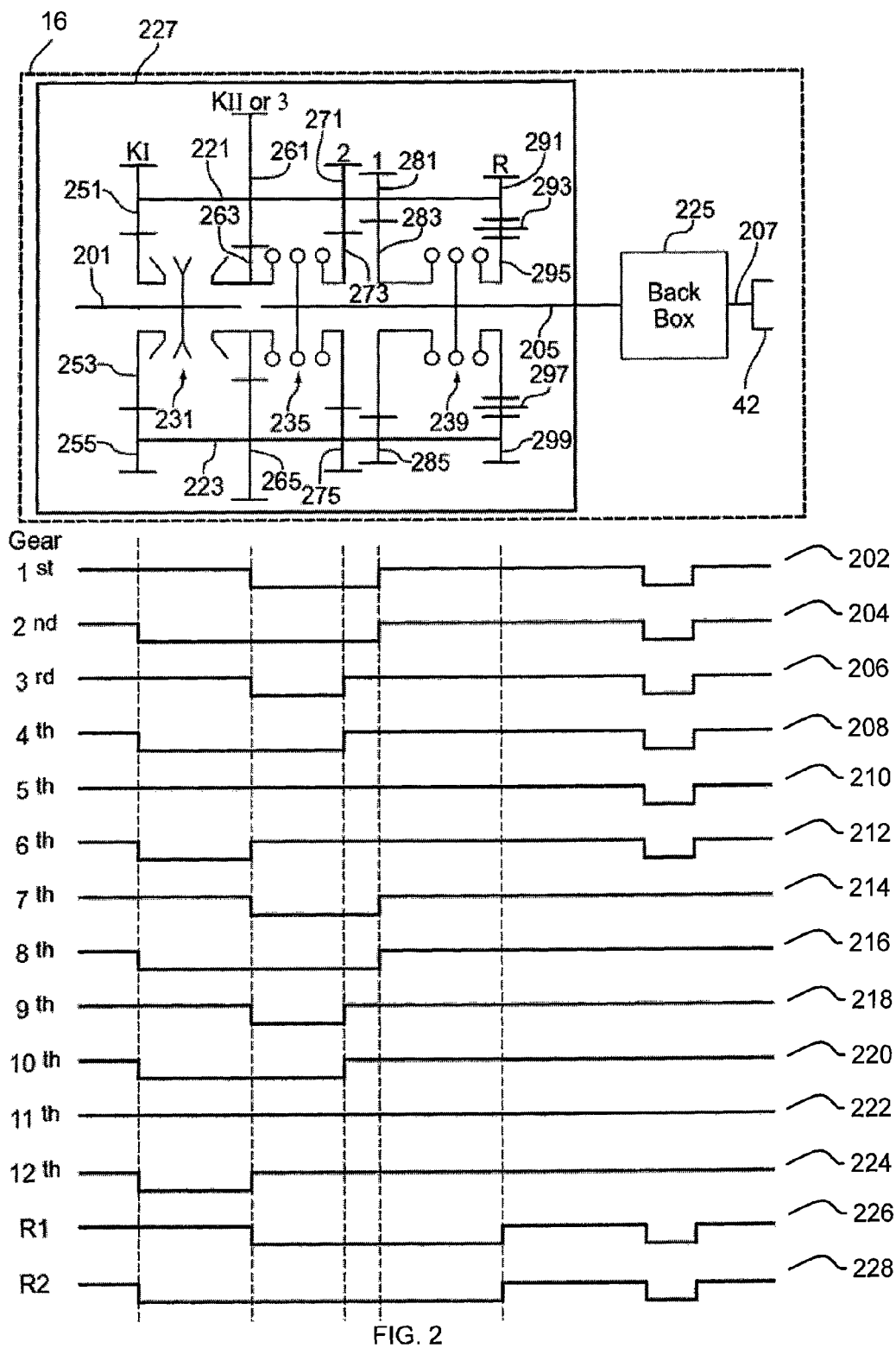
FIG. 2 is a schematic diagram illustrating the torque flow through an exemplary embodiment of a transmission system used in the vehicle of FIG. 1.

FIG. 2 is a schematic diagram illustrating the torque flow through an exemplary embodiment of a transmission system, such as the transmission 16 and actuator assembly 18 and accompanying controller 20 of FIG. 1. The transmission system 16, 18 may include a twelve speed overdrive transmission with two reverse gear settings designated R1 and R2 and 12 forward gear settings designated $1^{st}$, $2^{nd}$, $3^{rd}$, ..., $12^{th}$, which are typically referred to as reverse low gear, reverse high gear, $1^{st}$ gear, ... $12^{th}$ gear, respectively. The transmission 16 may include, but is not limited to, a transmission input shaft 201, a main shaft 205, counter shafts 221 and 223, a back box 225, and a transmission output shaft 207. The transmission 16 may include gear arrangements designated as KI, KII or 3, 2, 1, and R.

The gear arrangement KI may include a gear 251 that may be fixed on the counter shaft 221, a gear 255 that may be fixed on the counter shaft 223, and a gear 253 that may be operable to rotate around the input shaft 201. Similarly, the gear arrangement KII or 3 may include a gear 261 that may be fixed on the counter shaft 221, a gear 265 that may be fixed on the counter shaft 223, and a gear 263 that may be operable to rotate around the input shaft 201. A synchronizer 231 may engage the gear 253 to rotate it about the input shaft 201 and, therefore, rotate gears 251 and 255. Also, the synchronizer 231 may engage the gear 263 to rotate it about the input shaft 201 and, therefore, rotate gears 261 and 265.

The gear arrangement 2 may include a gear 271 that may be fixed on the counter shaft 221, a gear 275 that may be fixed on the counter shaft 223, and a gear 273 that may be operable to rotate about the main shaft 205. A dog clutch 235 may engage the gear 263 allowing the main shaft 205 to rotate based on the gear arrangement KII or 3. The dog clutch 235 may engage the gear 273 allowing the main shaft 205 to rotate based on the gear arrangement 2.

The gear arrangement 1 may include a gear 281 that may be fixed on the counter shaft 221, a gear 285 that may be fixed on the counter shaft 223, and a gear 283 that may be operable to rotate about the main shaft 205. The gear arrangement R may include a gear 291 that may be fixed on the counter shaft 221, a gear 299 that may be fixed on the counter shaft 223, a gear 295 that may be operable to rotate about the main shaft 205, and two idler gears 293 and 297 that may be operable to reverse the direction of rotation. A dog clutch 239 may engage the gear 283 allowing the main shaft 205 to rotate based on the gear arrangement 1. The dog clutch 239 may engage the gear 295 allowing the main shaft 205 to rotate based on the gear arrangement R.

The back box 225 may be a planetary back box that includes, but is not limited to, a sun gear, planetary gears (e.g., three planetary gears), and a synchronizer. The output shaft 207 may be operatively coupled to the back box 225. A yoke or universal joint 42 may be attached to the transmission output shaft 207, and the universal joint 42 may connect with a drive line, drive shaft, or propeller shaft.

Based on the engagement of the various synchronizers and dog clutches, such as synchronizer 231 and dog clutches 235 and 239, twelve different forward gear settings 202, 204, 206, 208, 210, 212, 214, 216, 218, 220, 222, 224, and two reverse settings 226, 228 may be provided. The torque or power flow through the transmission may vary depending on which gears are engaged in the transmission. For example, referring to FIG. 2, the transmission is in $1^{st}$ gear 202 when the synchronizer 231 is engaged with the gear 263 and the dog clutch 239 is engaged with the gear 283. In this case, the input shaft 201 drives the gear 263, which in turn drives the counter shafts 221 and 223 via the gears 261 and 265, respectively. The gear 283 drives the main shaft 205 via the gears 281 and 285. Therefore, the torque and power flows through the input shaft 201 to the counter shafts 221 and 223 via the gear arrangement KII or 3 and down to the main shaft 205 via the gear arrangement 1, as shown by the $1^{st}$ gear power/torque pattern 202 in FIG. 2.

Each redirection of power flow to and from the countershafts 221, 223 may result in power losses, such as heat generation associated with mechanical inefficiency of gears in mesh, the fluid forces associated with a gear churning transmission oil, and the frictional losses of spinning countershaft bearings or rotating components in contact with transmission seals. Moreover, the power transmitted from one gear tooth to another is reduced by friction losses and geometry losses. For example, as a gear enters into contact and exits from contact with a corresponding gear, relative sliding may occur along the path of contact. This sliding between gear teeth results in a power loss. The degree of sliding is dependent on the geometry or physical characteristics of the gears and their mating surfaces. Thus, the power loss between the transmission input shaft 201 and the transmission output shaft 207 may be lower in gears that redirect power through a fewer number of gear meshes. For example, in the exemplary transmission 16 shown in FIG. 2, $5^{th}$ and $11^{th}$ gears do not redirect power through any gear meshes in the front box 227, as illustrated by the corresponding gear power/torque patterns 210, 222. Those gear ratios are typically called direct drive selected gears, or simply direct drive.

Referring to FIG. 2, $5^{th}$ and $11^{th}$ gears are direct gears in a front box 227. In these gears, the synchronizer 231 and the dog clutch 235 simultaneously engage the gear 263 which directly connects the input shaft 201 and the main shaft 205. Therefore, the torque and power flow directly through the input shaft 201 and the main shaft 205. The torque flow to the output shaft 207 depends on the engagement of gears within the back box 225. The $11^{th}$ gear has direct torque or power flow from the input shaft 201 to the output shaft 207. Thus $11^{th}$ gear is also a direct gear in the back box 225 as illustrated by the corresponding gear power/torque pattern 222. In contrast, the torque/power flow for $5^{th}$ gear 210 shows a jog in the flow based on a gear arrangement within the back box 225, which indicates that the power is directed through two or more mating gears in the back box 225.

As previously stated, shifting to a direct gear may reduce the power loss between the transmission input shaft 201 and the transmission output shaft 207, because $5^{th}$ and $11^{th}$ gears do not redirect power through any gear meshes in the front box 227. Therefore, the processor 20 may command the transmission 16 to shift to $11^{th}$ gear at higher speeds to reduce power losses and shift to $5^{th}$ gear at lower speeds to reduce power losses, and thus, improve fuel economy.

The selection of a direct drive gear ratio may also depend on the engine speed after the shift to the target gear. For example, comparison of the $12^{th}$ gear power/torque pattern 224 and the $11^{th}$ gear power/torque pattern 222 suggests that shifting to $11^{th}$ gear may reduce power losses between the transmission input shaft 201 and the transmission output shaft 207, thus improving fuel efficiency. However, at a given vehicle speed, shifting from $12^{th}$ gear to $11^{th}$ gear will increase the engine speed, possibly increasing fuel consumption and offsetting the efficiency improvement in the transmission. In another embodiment, the fuel consumption of the engine is the same in every forward gear when the throttle is at the idle position (such as when the throttle pedal is not depressed by the operator). In this case, the engine speed may be less relevant to the selection of the target gear ratio.

Power losses in a transmission may be attributable to its components, such as bearings, gears, and seals. Some power losses are attributable to surfaces under pressure moving relative to each other, such as when engine power is transmitted from the transmission input shaft 201 to the transmission output shaft 207. In this case, power losses through the transmission may depend on the frictional forces between the gears, the speed of gear surfaces sliding against each other along the path of contact, and on the coefficient of friction of the gear surfaces in contact with each other. One way of minimizing power losses associated with transmitting power through gear meshes is to select a transmission gear ratio that minimizes the number of gear meshes used to transmit power, such as a direct drive gear. In addition to the number of meshes through which the torque/power flow is redirected between the transmission input shaft 201 and the transmission output shaft 207, other factors may also affect the power loss for a particular transmission gear ratio. Some losses are attributable to the rotation of moving parts in the transmission. For example, some power losses may be attributed to friction between transmission seals and rotating components, such as the transmission input shaft and the transmission output shaft. These losses may depend on the rotational speed of the components. In another example, displacement or churning of oil may cause power losses and can vary by gear ratio. The counter shafts 221 and 223 as well as their associated gears may reach into an oil sump in the transmission 16. The other shafts, such as the input shaft 201, the main shaft 205, and the output shaft 207, and their associated gears also may reach into the oil sump. As the gears turn, they may displace or churn a certain amount of oil, which results in a power loss. The amount of oil displaced or churned may be a function of the diameter or size of the gears, and hence, the gear ratio. Gear ratios having smaller diameter gears may have less power loss associated with displacement of gear oil in the sump or churning of gear oil. These and other transmission power losses may be calculated, or empirical data may be developed to define which ratios have the lowest power loss in a particular transmission system, and hence, which are most efficient.

The calculations or empirical data may also differ as a function of the rotational speed (revolutions per minute) of the transmission input shaft. The results may be expressed in terms of relative efficiencies, where each forward gear is ranked from most efficient (lowest power loss) to least efficient (greatest power loss) for a given engine speed. Table 1 shows an exemplary ranking of relative gear efficiencies for the transmission system of FIG. 2.

TABLE 1

| SELECTED GEAR OPTION | RELATIVE EFFICIENCY (1 = BEST) | | |
|---|---|---|---|
| | <1200 RPM | 1200-1400 RPM | >1400 RPM |
| $1^{st}$ | 5 | 4 | 4 |
| $2^{nd}$ | 2 | 2 | 2 |
| $3^{rd}$ | 4 | 5 | 5 |
| $4^{th}$ | 3 | 3 | 3 |
| $5^{th}$ | 1 | 1 | 1 |
| $6^{th}$ | 6 | 6 | 6 |
| $7^{th}$ | 5 | 4 | 4 |
| $8^{th}$ | 2 | 2 | 2 |
| $9^{th}$ | 4 | 5 | 5 |
| $10^{th}$ | 3 | 3 | 3 |
| $11^{th}$ | 1 | 1 | 1 |
| $12^{th}$ | 6 | 6 | 6 |

Table 1 may be stored in a memory or storage device within the controller 20 or in a memory or other storage device accessible to the controller 20. The controller 20 may send a pattern of different commands to switch between gears ratios, including a shift to a direct gear, based at least in part on the relative efficiency or power loss at a given time. For example, the controller 20 may utilize the engine speed and the relative efficiencies in the Table 1 to determine a more efficient gear ratio to utilize during a coasting condition. In one embodiment, the controller may select the most efficient gear ratio available. In another embodiment, the controller may select a more efficient gear ratio, but not the most efficient gear ratio available, because of other operating considerations evaluated by the controller.

In one embodiment, the gear ratio efficiency result may be the only factor that the controller 20 utilizes to select a gear ratio to shift to when a coasting condition is detected. In another embodiment, gear ratio efficiency may be one of several factors used by the controller 20 to select a gear at any given time when a coast condition is detected. For example, the controller 20 may detect that the vehicle 10 is travelling downhill, perhaps by receiving an input from an inclinometer, or by detecting an increase in vehicle speed attributable to gravity instead of a throttle input or the prime mover 12. In this case, while $5^{th}$ gear and $11^{th}$ gear have the same relative efficiency as shown in Table 1, $5^{th}$ gear may be preferable because the higher gear ratio allows prime mover braking to more effectively control the speed of the vehicle as it proceeds downhill. Referring back to FIG. 1, when the prime mover 12 includes an internal combustion engine, prime mover braking may include engine braking or exhaust braking. In electric or hybrid vehicle systems where the prime mover 12 includes an electric motor, prime mover braking may include regenerative braking such as those associated with charging a vehicle battery or power storage device by using the electric motor in the prime mover 12 as a generator coupled a vehicle drivetrain component, such as the transmission 16 input or output shafts, or the master friction clutch 14.

Figure 3:
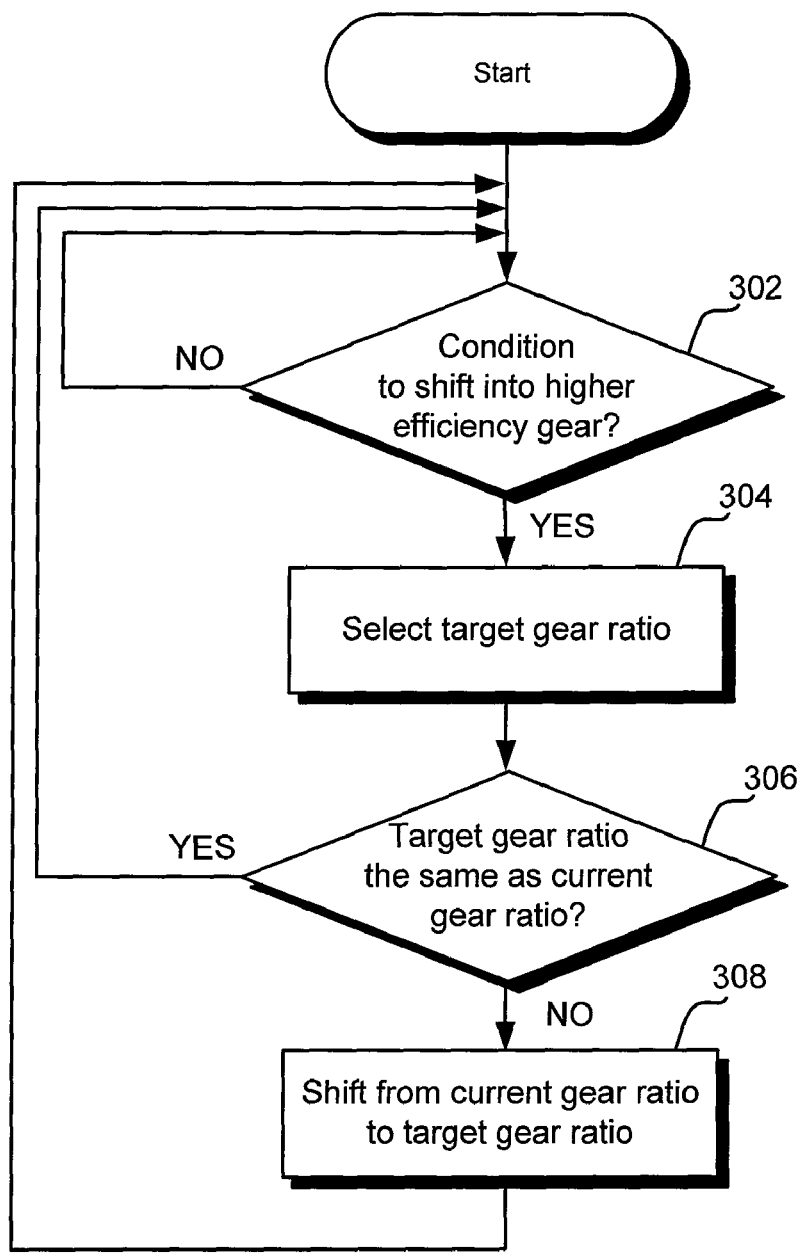
FIG. 3 shows exemplary steps for detecting coasting conditions and shifting into an appropriate gear ratio in accordance with an embodiment.

FIG. 3 shows exemplary steps for detecting coasting conditions and shifting into an appropriate gear ratio in accordance with an embodiment. An existing gear selection algorithm may be supplemented with the steps 300, which may utilize a table such as Table 1 to evaluate possible target selected gears based on relative efficiency or relative power loss information.

Control begins at step 302, in which the controller 20 evaluates whether a condition to shift into a higher efficiency gear exists. In one embodiment, a controller may shift into a higher efficiency gear in response to detecting a vehicle coasting condition. A vehicle coasting condition may be detected by evaluating one or more controller input signals, such as may be transmitted over a vehicle Controller Area Network (CAN) bus in accordance with standards such as the SAE J1939-71 standard. The controller may detect a vehicle coasting condition by receiving an input indicative of the position of the vehicle throttle pedal or brake pedal, and comparing it to a predetermined position. For example, the vehicle may be coasting when the vehicle operator is not depressing the throttle pedal. In another example, vehicle may be coasting when the vehicle operator is not applying the brake pedal. The controller may detect a vehicle coasting condition by receiving an input indicative of the position of the vehicle throttle or a setting of a power metering device of the prime mover and comparing it to a predetermined position or setting. For example, if the throttle is controlled by a driving speed control unit, sometimes called cruise a control unit, the throttle position may be evaluated to determine whether the vehicle is coasting. In another example, the controller may detect a vehicle coasting condition by detecting a predetermined grade of a road surface the vehicle is travelling on. In one embodiment, the controller may receive an input from an inclinometer to detect the grade of the road surface. In another embodiment, the controller may detect a constant or increased vehicle speed attributable to gravity instead of a throttle input or the prime mover 12, and conclude that the vehicle is travelling down a grade.

If a condition to shift into a higher efficiency gear does not exist, the test in step 302 may be repeated after a period of time or when input signals change. If a condition to shift into a higher efficiency gear does exist, control passes from step 302 to step 304, in which a target gear ratio is selected. In one embodiment, the controller 20 accesses a table, such as Table 1, to select a relatively more efficient gear ratio. The selection may also depend on the engine speed. In another embodiment, the fuel consumption of the engine is the same in every forward gear when the throttle is at the idle position (such as when the throttle pedal is not depressed by the operator). In this case, the engine speed may be less relevant to the selection of the target gear ratio.

In one embodiment, the selection of the target gear ratio may also depend on the engine braking effectiveness when the retarding power of the engine is coupled from the transmission input to the transmission output at a given gear ratio. If the vehicle is travelling down a grade, the controller may select a target gear ratio based on the relative efficiency of a given gear ratio, and effectiveness of engine braking when the transmission is shifted to that ratio. In one embodiment, a candidate gear ratio may not be selected if the engine braking torque, when multiplied by the candidate gear ratio, is less than a minimum required for safe operation of a vehicle travelling down a grade.

Control then passes to step 306, in which the target gear ratio is compared to the current gear ratio. If the target gear ratio is the same as the current gear ratio, then no shift is required, and control passes back to step 302 to perform another test after a predetermined amount of time has elapsed. Otherwise, control passes to step 308, and the controller 20 shifts the transmission from the current gear ratio to the target gear ratio, and control returns to back to step 302 to perform another test after a predetermined amount of time has elapsed.

Thus, the exemplary steps 300 may supplement a gear selection algorithm in a transmission system, such as an automated manual transmission system, in order to improve the fuel efficiency of a vehicle when coasting conditions are detected. The controller analyzes input data that may indicate that the vehicle is coasting. For example, the controller may detect that the vehicle operator is not depressing the throttle pedal or the brake pedal, or that the vehicle is travelling down a grade. In response to detecting a condition indicative of vehicle coasting, the controller may evaluate the available target gear ratios and identify a more efficient gear ratio, where efficiency may be expressed as the loss of power from the transmission input shaft to the transmission output shaft for a given engaged gear ratio. If a more efficient target gear ratio is available, the controller may shift the transmission to that gear. As a result, the fuel efficiency of the vehicle may be improved, while keeping the vehicle under constant engine braking or continuous engine control for safe operation. In one embodiment, the controller may also evaluate additional factors when selecting a more efficient target gear ratio. For example, each gear ratio may have a relative effectiveness for engine braking. When two gear ratios have similar relative efficiencies, the controller may select a target gear with a higher gear ratio in order to allow engine braking to more effectively control the speed of the vehicle as it proceeds downhill. Depending on the implementation, the controller may prioritize factors such as engine braking effectiveness ahead of or after efficiency improvements when selecting a target gear ratio.

Any of the features, processes, or methods discussed above may be mixed and matched together to create a variety of efficient gear selection systems and/or methods for a vehicle, such as a truck. The system described above for shifting to a direct drive gear or to a more efficient gear during coasting conditions may be in communication with a remote station or device via any variety of wireless networks and/or protocols. An operator at the remote station or operating the remote device may enable any of the shift algorithms discussed above. Although the invention has been described with respect to various system and method embodiments, it will be understood that the invention is entitled to protection within the full scope of the appended claims.

The invention claimed is:

1. A method of changing gear ratios of a transmission in a vehicle, the method comprising:
   detecting a coast condition in a vehicle having a transmission operative to couple prime mover power from a transmission input to a transmission output at a plurality of different gear ratios, wherein each gear ratio is associated with a power loss attribute indicative of a power loss between the transmission input and transmission output when the prime mover power is coupled from the transmission input to the transmission output using the associated gear ratio;
   selecting a target gear ratio based on the power loss attributes associated with each gear ratio, wherein the target gear ratio is a direct drive gear ratio; and
   shifting from a current gear ratio to the target gear ratio if the target gear ratio is not the same as the current gear ratio.

2. The method of claim 1, wherein detecting a coast condition comprises detecting a predetermined position of a vehicle brake pedal.

3. The method of claim 1, wherein detecting a coast condition comprises detecting a predetermined position of a vehicle throttle pedal.

4. The method of claim 1, wherein detecting a coast condition comprises detecting a predetermined setting of a power metering device of a prime mover of the vehicle.

5. The method of claim 1, wherein detecting a coast condition comprises detecting a predetermined grade of a road surface the vehicle is travelling on.

6. The method of claim 1, wherein each gear ratio is further associated with a torque multiplier attribute indicative of an effectiveness of the associated gear ratio for prime mover braking, wherein selecting a target gear ratio based on the power loss attributes associated with each gear ratio comprises selecting a target gear ratio based on the power loss attribute and the torque multiplier attribute associated with each gear ratio.

7. The method of claim 1, wherein the power loss attributes associated with each gear ratio are affected by factors comprising at least one of:
    gear oil churning;
    frictional losses;
    number of gear meshes engaged;
    number of moving parts engaged; and
    gear geometry.

8. A method of changing gear ratios of a transmission in a vehicle, the method comprising:
    detecting a coast condition in a vehicle having a transmission operative to couple prime mover power from a transmission input to a transmission output at a plurality of gear ratios, wherein each gear ratio is associated with a power loss attribute indicative of a power loss between the transmission input and transmission output when the prime mover power is coupled from the transmission input to the transmission output using the associated gear ratio, and wherein each gear ratio is associated with a torque multiplier attribute indicative of an effectiveness of the associated gear ratio for prime mover braking;
    selecting a target gear ratio based on the power loss attribute and the torque multiplier attribute associated with each gear ratio, wherein the target gear ratio is a direct drive gear ratio; and
    shifting from a current gear ratio to the target gear ratio if the target gear ratio is not the same as the current gear ratio.

9. The method of claim 8, wherein detecting a coast condition comprises detecting a predetermined position of a vehicle brake pedal.

10. The method of claim 8, wherein detecting a coast condition comprises detecting a predetermined position of a vehicle throttle pedal.

11. The method of claim 8, wherein detecting a coast condition comprises detecting a predetermined setting of a power metering device of a prime mover of the vehicle.

12. The method of claim 8, wherein detecting a coast condition comprises detecting a predetermined grade of a road surface the vehicle is travelling on.

13. The method of claim 8, wherein the power loss attributes associated with each gear ratio are affected by factors comprising at least one of:
    gear oil churning;
    frictional losses;
    number of gear meshes engaged;
    number of moving parts engaged; and
    gear geometry.

14. A vehicle, comprising:
    a prime mover;
    a transmission operative to couple prime mover power from a transmission input to a transmission output at a plurality of different gear ratios, wherein each gear ratio is associated with a power loss attribute indicative of a power loss between the transmission input and transmission output when the prime mover power is coupled from the transmission input to the transmission output using the associated gear ratio;
    a sensor, operative to receive a signal indicative of a coasting condition of the vehicle; and
    a controller, in communication with the sensor and the transmission, operative to:
        shift to a current gear ratio of the transmission;
        detect a coasting condition;
        select a target gear ratio based the power loss attribute associated with each gear ratio, wherein the target gear ratio is a direct drive gear ratio; and
        shift from the current gear ratio to the target gear ratio if the target gear ratio is not the same as the current gear ratio.

15. The vehicle of claim 14, wherein detecting a coast condition comprises detecting a predetermined position of a vehicle brake pedal.

16. The vehicle of claim 14, wherein detecting a coast condition comprises detecting a predetermined position of a vehicle throttle pedal.

17. The vehicle of claim 14, wherein detecting a coast condition comprises detecting a predetermined setting of a power metering device of a prime mover of the vehicle.

18. The vehicle of claim 14, wherein detecting a coast condition comprises detecting a predetermined grade of a road surface the vehicle is travelling on.

19. The vehicle of claim 14, wherein each gear ratio is further associated with a torque multiplier attribute indicative of an effectiveness of the associated gear ratio for prime mover braking, wherein selecting a target gear ratio based on the power loss attributes associated with each gear ratio comprises selecting a target gear ratio based on the power loss attribute and the torque multiplier attribute associated with each gear ratio.

20. The vehicle of claim 14, wherein the power loss attributes associated with each gear ratio are affected by factors comprising at least one of:
    gear oil churning;
    frictional losses;
    number of gear meshes engaged;
    number of moving parts engaged; and
    gear geometry.

* * * * *